US006766222B1

(12) United States Patent
Duley

(10) Patent No.: US 6,766,222 B1
(45) Date of Patent: Jul. 20, 2004

(54) POWER SEQUENCER CONTROL CIRCUIT

(75) Inventor: Raymond S. Duley, Buda, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 256 days.

(21) Appl. No.: 09/594,220

(22) Filed: Jun. 14, 2000

(51) Int. Cl.$^7$ .............................................. G05D 11/00
(52) U.S. Cl. ..................... 700/286; 700/295; 307/41; 361/195; 713/330
(58) Field of Search ................... 700/297, 292, 700/286, 295, 296, 298; 323/238; 307/139, 141.8, 41, 141; 713/330; 361/196, 195, 197–202, 189–191

(56) References Cited

U.S. PATENT DOCUMENTS

| | | | |
|---|---|---|---|
| 3,205,368 A | | 9/1965 | Miracle |
| 3,699,390 A | * | 10/1972 | Blakeslee .................. 361/57 |
| 3,714,519 A | * | 1/1973 | Swinea, Jr. ................ 361/198 |
| 4,144,552 A | | 3/1979 | Sibalis |
| 4,172,525 A | * | 10/1979 | Hams et al. ................ 209/564 |
| 4,296,449 A | * | 10/1981 | Eichelberger ................ 361/3 |
| 4,443,709 A | * | 4/1984 | Genuit et al. ................ 307/41 |
| 4,500,795 A | * | 2/1985 | Hochstein et al. .......... 307/141 |
| 4,593,349 A | * | 6/1986 | Chase et al. ................ 307/29 |
| 4,674,031 A | * | 6/1987 | Siska, Jr. .................... 307/38 |
| 4,692,817 A | * | 9/1987 | Theis ......................... 360/12 |
| 4,769,555 A | * | 9/1988 | Pequet et al. ............... 307/112 |
| 5,269,002 A | * | 12/1993 | Bourgouin et al. ......... 711/109 |
| 5,398,001 A | * | 3/1995 | Rapp ......................... 327/258 |
| 5,424,903 A | * | 6/1995 | Schreiber ................... 361/166 |
| 5,430,598 A | * | 7/1995 | Rodolfo et al. ............ 361/115 |
| 5,563,455 A | | 10/1996 | Cheng |
| 5,644,174 A | * | 7/1997 | Cheng et al. ............... 307/38 |
| 5,763,960 A | * | 6/1998 | Ceccherelli et al. ........ 307/130 |

FOREIGN PATENT DOCUMENTS

EP          0 430 671          6/1991

OTHER PUBLICATIONS

International Search Report, application No. PCT/US 01/07549, mailed May 7, 2002.

* cited by examiner

Primary Examiner—Leo Picard
Assistant Examiner—Alexander Kosowski
(74) Attorney, Agent, or Firm—Robert C. Kowert; Meyertons, Hood, Kivlin, Kowert & Goetzel, P.C.

(57) ABSTRACT

A system and method are presented for sequentially applying electrical power to multiple loads. The system is capable of operating in conjunction with other such systems as either a slave or master. When operating as a master, the system is activated as soon as it is turned on, and begins sequentially applying power to the loads connected to its output channels. When operating as a slave, the system must first receive an enable input signal from the master to which it is connected. The master/slave assignment is switch-selectable; thus, series-connected units may be reconfigured from single to multiple masters, or vice-versa, with no wiring changes. The new system is believed to provide the benefits of improved reliability and reduced cost for power distribution networks, by eliminating startup current surges resulting from simultaneously powering-up all of the attached loads, thereby reducing stress on components.

33 Claims, 5 Drawing Sheets

POWER SEQUENCER CONTROL CIRCUIT

BACKGROUND OF THE INVENTION

1. Field of Invention

This invention relates to power control and, more particularly, to moderating the application of power to electronic circuitry.

2. Description of Related Art

Electronic systems are frequently comprised of several modules, each drawing AC power from a common source. Furthermore, power supplies used in electronic equipment characteristically demand a high momentary current at startup. Therefore, switching on all of the modules simultaneously can result in a substantial combined startup current. Excessive transient currents associated with such a concurrent startup can induce strong magnetic fields or voltage spikes that may overstress electronic devices, causing them to fail.

High cumulative startup current arising from simultaneous activation of multiple devices is often a problem in rack-mounted electronic test systems. Such systems typically consist of several electronic test equipment and instruments that are mounted together in an equipment rack and plugged into the same AC power source. The rack generally has a single master power switch; when the switch is closed, all of the equipment in the rack is activated at once. (Note that the power coming back on line following a power outage can also produce the same transient as turning on the power switch.) Since the startup currents, also known as inrush startup currents, are additive, the combined transient current may be high enough to cause damage.

A further example of this problem may be the distributed power supply within a personal computer. The central processor in modern personal computers has grown tremendously in terms of operating speed and processing power. However, increased complexity and greater current consumption have accompanied improvements in performance. The CPU used in the original IBM Personal Computer contained a mere 29,000 transistors, ran at a clock speed of only 5 MHz, and required only 0.05 Amperes of operating current. A present day CPU, such as the AMD Athlon processor, may contain 22 million transistors, run at a clock speed of more than 1 GHz, and consume over 35 Amperes of current. The computer power supply must support not only the CPU, but disk drives, peripheral circuit cards, peripheral modules, etc. When the computer is first switched on, the simultaneous imposition of these various loads burdens the power supply to supply huge inrush currents that cause large magnetic fields and large voltage spikes. The electromagnetic fields associated with large transient currents may also interfere with the initialization of the system.

It is common practice to include protective devices such as surge arrestors and soft-start circuitry in electronic power supplies. Such devices have limited effectiveness in mitigating the effects of line voltage surges, and reducing the magnitude of startup currents. Despite these measures, the peak startup current will often be significantly higher than the rated steady state current of the power supply. As discussed above, the combined startup currents of multiple power supplies may be high enough to induce electromagnetic effects; such phenomena can interfere with the power supply or supported circuitry, and are not amenable to surge arrestors and the like. Furthermore, these collective startup currents may severely overload the power mains and associated switching components.

Connected with reliability issues, such as those discussed above, are cost concerns. Power components that must be subjected to concurrent startup currents are of necessity overbuilt. The design engineer's traditional "worst case" criterion dictates that device tolerances be sufficient to avoid failure with startup current demands that may be far in excess of the nominal operating conditions. Unfortunately, larger transformers, heavier switch contacts, etc. are typically costlier. Added expense is associated with circuits to supply large inrush currents and output modules to withstand voltage and magnetic surges. Thus, the need to tolerate simultaneous startup currents drives up the cost of the power distribution components.

In view of the above-mentioned problems, it would be beneficial to have an automatic system for applying power to multiple loads that avoids simultaneous startup currents. The system should be capable of performing an orderly restart in the event of power loss and recovery. It would be advantageous if the system were capable of operating with either an AC or a DC-based power source. Moreover, the system should be inexpensive and readily adaptable to perform power sequencing in a variety of different applications, e.g., computer peripherals, test equipment racks, automated production lines.

SUMMARY OF THE INVENTION

The problems outlined above are in large part solved by a power sequencing system and method. The system described herein sequentially connects multiple loads to a main power source, thereby distributing the startup current over time and minimizing the possibility of component stress and interference associated with surge currents. It operates during either an initial application of power, or the recovery of power following an outage. The system is simple and inexpensive, and lends itself to incorporation into a variety of products. Furthermore, it can be easily manufactured into an integrated circuit, or placed on the substrate of an existing IC as an on-chip peripheral device.

A power sequencer is contemplated, comprising a set of controllable power switching elements and associated circuitry for timing, signal distribution and control. The power switching elements receive, via the distribution circuitry, progressively delayed versions of a logic transition. The switching elements are thus activated by the circuitry in a timed sequence, and consecutively connect multiple loads to a power source. Since the loads are connected in stages, rather than simultaneously, the massive current associated with a combined startup is avoided. A further feature of the present design is the capability of series-connecting multiple power sequencers, such that each sequencer in the series is enabled only after its predecessor has completed its sequence. Assume, for example, that sequencers A and B each support 8 loads, and that B is enabled by A. When power is first applied, sequencer A successively connects its 8 loads to the power source at regular intervals. Until the $8^{th}$ of sequencer A's loads is connected, sequencer B remains inactive and its loads are isolated from the power source. When its $8^{th}$ load is connected, sequencer A enables sequencer B, allowing it to begin sequentially connecting its 8 loads. In effect, the two series-connected sequencers behave as a single sequencer with a 16 load capacity. Arbitrarily many sequencers can be connected in this manner; each sequencer enables the next, and is itself enabled by the previous sequencer.

In an exemplary embodiment, the power sequencer comprises a logic-controlled timer and shift registers, which energize a set of relays that distribute power to multiple loads. The relays are actuated consecutively, at fixed intervals; thus, power is applied to the loads in stages, rather than all at once. This results in a much lower peak startup current than if the loads were brought up simultaneously. For example, in a test rack comprising 16 identical electrical loads, the power sequencer reduces the inrush current to $\frac{1}{16}$ what it would be if all the loads were energized at once. The logic controlling the startup sequence can be configured to operate in either a master or slave mode. In the master mode, the startup sequence begins as soon as the system is activated. In the slave mode, on the other hand, an enable input signal is required before sequencing can begin. This feature makes it possible to "daisy-chain" multiple power sequencers, for use in situations involving a large number of loads, or where the loads are widely separated.

It should be noted that although a multi-load system can in some cases be brought on-line manually, so that power is sequentially applied to the loads, this does not safeguard the system against power outages. Current surges frequently take place when system power is abruptly restored following a power outage. All of the devices that were operating when the outage occurred simultaneously restart when the power returns, often resulting in a huge combined startup current. Thus, the mere practice of manually sequencing power to multiple loads does not protect against current surges.

The system described herein can be applied to both AC and DC power distribution, and may be advantageous in a variety of applications to minimize the cost of power supplies and input circuits, and reduce EMI emissions. It is inexpensive and scalable, and can easily be produced as a low-cost integrated circuit. Thus, it lends itself to inclusion as a value-added feature in products such as power strips.

In addition to the above-mentioned system, a method for implementing sequential application of power to multiple loads is contemplated herein. The method may comprise creating a sequence of voltage steps, wherein each voltage step in the sequence is delayed by a prescribed interval with respect to the previous steps. The progressively delayed series of voltage steps actuates power-switching components that, in turn, deliver power to the individual loads.

BRIEF DESCRIPTION OF THE DRAWINGS

Other objects and advantages of the invention will become apparent upon reading the following detailed description and upon reference to the accompanying drawings in which.

Figure 1:
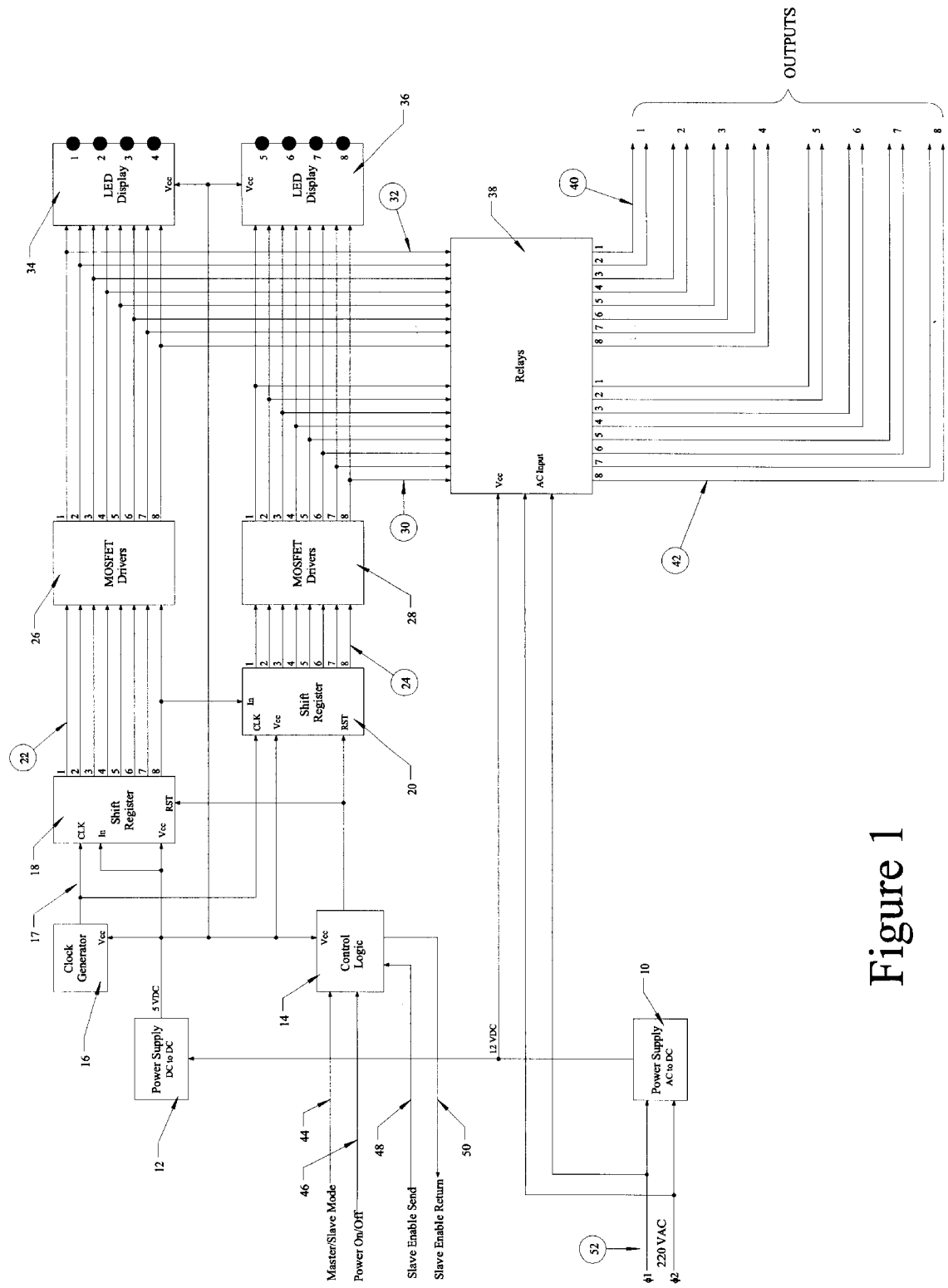
FIG. 1 is a block diagram of an exemplary embodiment of the power sequencing system described herein.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The following discussion relates to an embodiment of the power sequencer described herein for use with rack-mounted test systems. This exemplary embodiment will be used to illustrate the basic principles of the system, but it should not be inferred that application of the present system and methods are limited only to this embodiment. On the contrary, the system and methods are believed to useful for a very broad range of power distribution and control applications, some examples of which will be provided below.

FIG. 1 shows a block diagram of one embodiment of the power sequencer. In this diagram, circled item numbers refer to groups of signal lines, i.e., buses. An individual signal line within a bus is denoted by the bus item number followed by a dash and the line number. For example, the signal line connecting the $8^{th}$ output of shift register 18 to the corresponding input of MOSFET driver module 26 would be denoted 22-8. Bus signal numbers in FIG. 1 appear near the origin of the signal line. Also, in the discussion that follows, logic signals are assumed to have two possible states, referred to as "High" and "Low".

In the embodiment of FIG. 1, all power is ultimately derived from the AC line 52. The AC line is connected to an AC-DC power supply 10, which provides 12 Volts for the power sequencer internal circuitry. The AC line is also connected to relay module 38. In this illustrative embodiment, the relay module comprises 8 pairs of relays to selectively apply power to 8 load channels on the sequencer output buses 40 and 42. Depending on the specific application, these relays may be either conventional electromechanical devices or some type of solid-state relay. The 12 Volt output of the AC-DC power supply 10 is regulated down to 5 Volts by linear regulator or DC-DC switching power supply 12 and distributed to logic. In this embodiment, a clock generator 16 serves as the timing source for the sequencer, and may be a crystal oscillator, multivibrator or similar device capable of furnishing a suitable timing signal. Clock generator 16 provides a pulse sequence on signal line 17 to shift registers 18 and 20, which serve as the distribution network in this embodiment. A shift register is a clock-driven multi-stage device, commonly employed in digital logic design. A logic level present at the input of a shift register is clocked successively through its stages, in bucket-brigade fashion. In the case of shift registers 18 and 20, an output line is associated with each stage; thus, the input state is both delayed and distributed by the shift register. Shift registers 18 and 20 are held in a reset state by control logic 14. While in reset, they ignore the pulses from the clock generator, and their output lines 22 and 24 are all Low. The period during which control logic 14 maintains the reset state is dependent on whether the power sequencer is operating as a master or as a slave, which is determined by the state of the Master/Slave Mode signal line 44. If the sequencer is operating as a master, the reset state is lifted following a brief initialization period after the Power On/Off switch 46 is switched on. If the sequencer is operating as a slave, however, the reset state is maintained until the master sends an enable output signal over Slave Enable Send 48 and Slave Enable Return 50 lines. This mode of operation allows connection of several power sequencers in cascade, making it possible to successively activate a larger number of loads, or loads which are remotely located. Since the enable signal is DC-isolated from Master to Slave, there is no limit to the number of Slaves that can be driven by one Master.

Shift registers 18 and 20 contain 8 stages in this exemplary embodiment, and propagate the logic levels present at their inputs through successive stages at each transition of the clock. The logic level at each stage is brought out on a respective pin, i.e., buses 22 and 24. In this case, the serial input to the first shift register 18 is hard-wired to a High logic level, and the input to the second shift register 20 is connected to the last stage of the previous shift register 18. Therefore, as soon as the reset condition is removed, shift registers 18 and 20 respond to the clock generator by propagating a logic High successively through each stage of the first shift register 18, and then in the same manner, through the second shift register 20. The outputs of shift registers 18 and 20, buffered by MOSFET modules 26 and 28, actuate the relays in Relay module 38. This sequence of events is shown in the timing diagram in FIG. 2.

Figure 2:
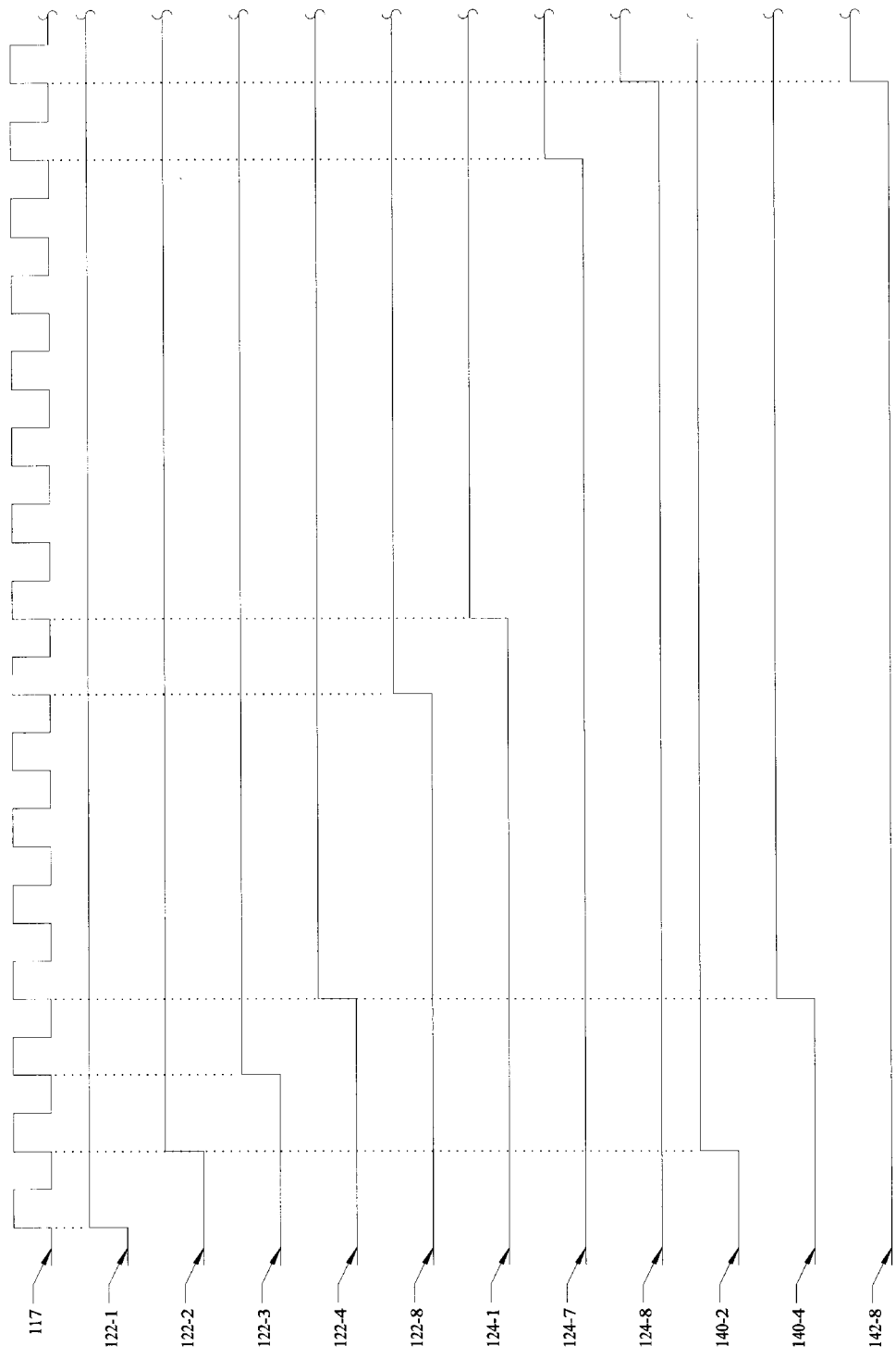
FIG. 2 is a timing diagram for the power sequencer, showing the relative timing of the clock, shift register and power-switching components.

The logic state of several of the signals represented in the embodiment of FIG. 1 are shown as a function of time in FIG. 2. Note that the item number for each of the traces is derived by adding 100 to the item number of the corresponding signal. For example, the trace depicting the transitions of signal 22-3 (third output of shift register 18) is labeled 122-3. All timing is relative to the clock 117, and transitions are (arbitrarily) assumed to occur on the rising edge of the clock; the dotted vertical lines indicate coincidence. In this illustrative embodiment, the clock period is approximately 0.5 seconds. Thus, for example, the rising edges of traces 140-2 and 140-4 are 1.0 seconds apart. However, the clock period could range from 0.1 seconds to hours, depending on the application.

Traces 122-1 through 122-8 in FIG. 2 illustrate how a logic High is propagated through the stages of shift register 18, coincident with cycles of the clock 117. This is also true of shift register 20, as evident in traces 124-1 through 124-8. Note that the first state change in shift register 20 does not occur until after the last ($8^{th}$) stage of shift register 18 has changed state; this reflects the fact that the shift registers are connected in series. As discussed in greater detail below, each of the sequencer main output channels comprises a double-pole connection. That is, two switching elements are associated with each load, and closure of both is necessary to connect the load to the power source. For example, output channel 3 in FIG. 1 comprises signal lines 40-5 and 40-6; 40-5 connects the load to the high side of the power source, and 40-6 connects the load to the low side. Thus, the circuit is completed by the second relay. This is evident in the relationship between the clock trace 117 and traces 140-2, 140-4 and 142-8 in FIG. 2. For example, the first output of Shift Register 18 (signal line 22-1) is buffered by a MOSFET (signal line 32-1) and actuates one of the two relays associated with output channel 1 (signal line 40-1). Similarly, the second output of Shift Register 18 (signal line 22-2) is buffered by a MOSFET (signal line 32-2), actuates the other relay (signal line 40-2), and thus completes the connection of output channel 1. This is indicated in FIG. 2 by the dotted line linking the rising edge of 140-2 with that of 122-2.

MOSFET driver modules 26 and 28 in FIG. 1 each comprise 8 MOSFET transistors. These MOSFETs may be discrete devices, or combined as an integrated circuit. In alternative embodiments, other types of current-amplifying devices capable of driving a relay coil may be used, such as bipolar transistors. Each shift register output is connected to the gate of a MOSFET via buses 22 and 24. As a shift register stage goes High, the corresponding output line drives the gate of the respective MOSFET High, turning it on. The drain of each of the MOSFETs is connected to the coil of a relay in module 38, and there are two MOSFETs and two relays for each load. Also coupled to the MOSFET drivers are LED modules 34 and 36, such that there is one LED associated with each of the load channels, and each LED lights when the corresponding channel is energized (i.e., when both the associated MOSFETs are on). Thus, for example, LED 3 in module 34 could be driven by a NOR gate with inputs connected to lines 32-5 and 32-6, such that it would light when both these lines go Low; this would serve to indicate that both of the relays associated with output channel 3 are closed.

Figure 3:
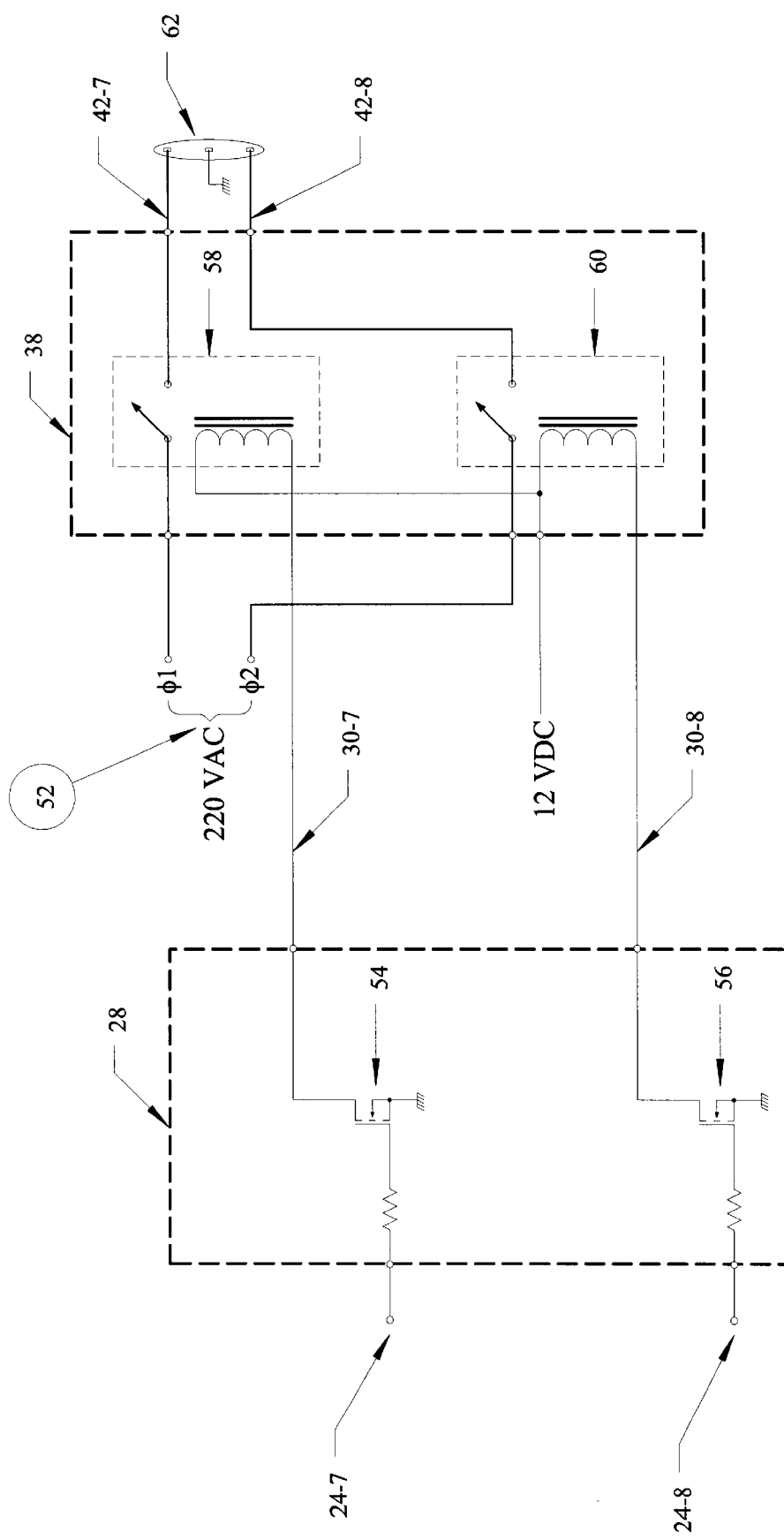
FIG. 3 illustrates an embodiment of the power switching portion of the sequencer.

As an example, the circuitry associated with the $8^{th}$ output channel of relay module 38 and MOSFET driver module 28 is illustrated in FIG. 3. Note that each of the two phases of the 220 VAC line 52 is connected to a relay; $\phi1$, on line 52-1, is connected to upper relay 58 and $\phi2$, on line 52-2, is connected to lower relay 60. When a relay closes, it connects its associated phase to output receptacle 62, via output line 42-7 or 42-8. As stated above, the MOSFET driver modules contain a MOSFET for each of the relays in relay module 38. The two MOSFETs 54 and 56 shown in FIG. 3 are driven by the $8^{th}$ pair of shift register outputs, 24-7 and 24-8. Upper relay 58 is connected via bus line 30-7 to MOSFET 54, and lower relay 60 is connected via bus line 30-8 to MOSFET 56. When either MOSFET switches on, it sinks current through its respective relay coil. This causes the normally-open relay contacts to close, connecting one of the phases of the 220 VAC line to a load. In the present embodiment, the interval between the activation of one load and the next is 1.0 seconds, since both relays must close to complete the connection to the load. It should be obvious that in alternative embodiments, the line voltage could be 110 VAC, or a DC value, or the interval made larger or smaller.

Figure 4A:
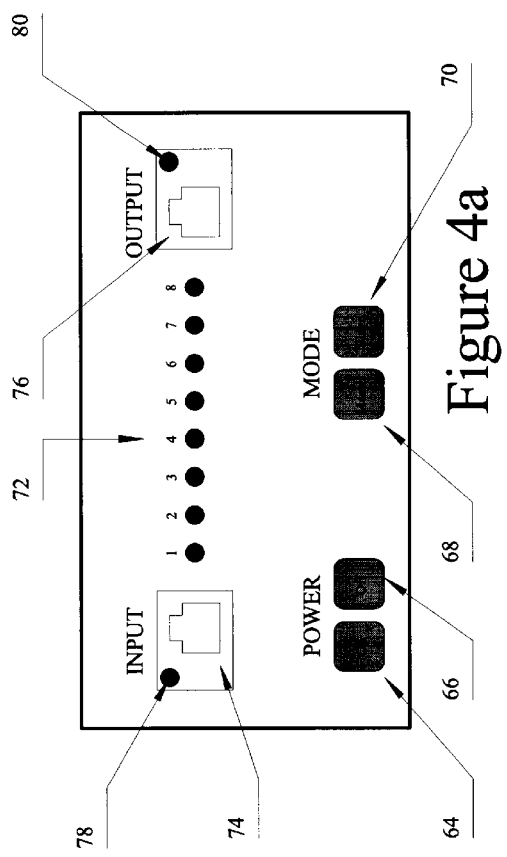
FIG. 4 illustrates the front panel layout of an embodiment of the power sequencer, and the connection of multiple sequencers together in a cascade arrangement.

The front panel for an illustrative embodiment of the power sequencer is shown in FIG. 4a. Power switches 64 and 66 are provided to turn the unit on or off, and mode switches 68 and 70 to configure it as either master or slave (discussed further below). A row of LEDs 72 indicates which outputs are active. Also present are a pair of modular RJ-11 jacks (the same type used in a telephone wall jack), one of which 74 is an input and the other of which 76 is an output. LEDs 78 and 80 associated with each of these jacks indicate when the corresponding input or output is active.

Figure 4B:
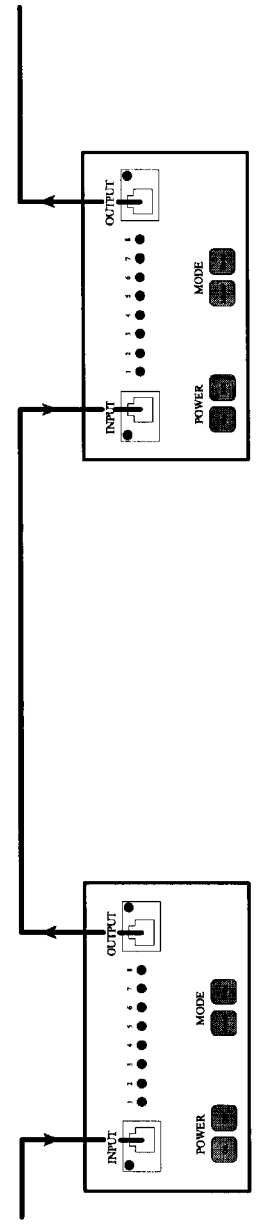

Power sequencers may readily be combined to augment output capacity. Two or more power sequencers can be interconnected using RJ-11, or other connectors. (RJ-11 connectors are believed to be particularly inexpensive and readily available.) The power sequencers can be linked as master and slave by connecting the output of the designated master to the input of the designated slave, as shown in FIG. 4b. When activated, the master sequentially applies power to its outputs, in the manner described earlier. However, the slave is held off until the master has completed its sequence; only then does it begin to sequentially power-up its outputs. Thus, the operation of the master/slave combination is equivalent to that of a single sequencer with twice as many channels. Furthermore, multiple power sequencers can be cascaded in this fashion, with each sequencer serving to enable the next. This extends the capability of a single power sequencer to arbitrarily many loads. In addition to the connection scheme depicted in FIG. 4b, combined operation of multiple sequencers requires that each sequencer be properly configured as either master or slave. As previously mentioned, this is done in the embodiment of FIG. 4b by using the mode switches on the front panel. Note that, although any number of power sequencers can be cascaded, only the first in the series can be the master; the remaining sequencers must all be configured as slaves. This permits an enable output signal to be originated by the master and then relayed from slave to slave. The ability of the mode switches to reconfigure a power sequencer as either Master or Slave can be highly advantageous. For example, a complex system may consist of 100 series-connected power sequencers, with 1 Master and 99 Slaves. Using the mode switches, this system can be readily reconfigured as one with 50 Masters and 50 Slaves, with no change in wiring.

An important inherent feature of the master/slave interconnection is its very high noise immunity. The slave input of the power sequencer is isolated from the rest of the sequencer circuitry; therefore, each sequencer in a series combination of sequencers is isolated from all the others. Moreover, a relatively high signal level is required to enable the slave. As a result, the number of power sequencers that can be cascaded is not limited by cumulative noise, and the possibility of false triggering of a slave by environmental noise is remote. An embodiment of the circuitry by which this is accomplished is illustrated in FIG. 5.

Figure 5:
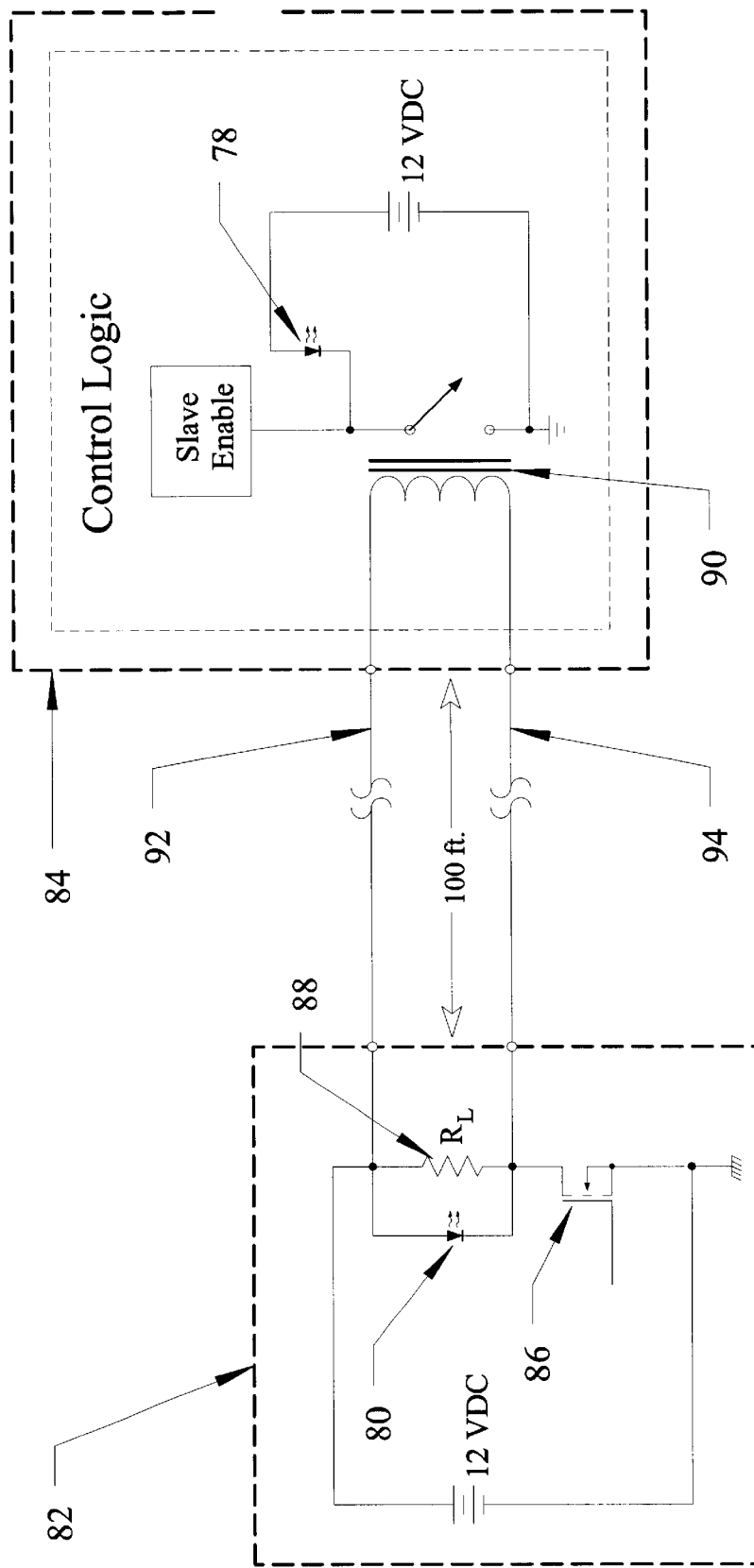
FIG. 5 illustrates an embodiment of the master/slave circuitry used when connecting several power sequencers together.

FIG. 5 shows a portion of the master 82, comprising a MOSFET 86 from within the MOSFET module 38 shown in FIG. 1. The load for this MOSFET 88 is shown for simplicity as a resistor, but actually comprises a relay primary (as shown in FIG. 3) and other components. In addition, the MOSFET 86 drives an enable relay 90 in the slave 84. The connection between master 82 and slave 84 is a two-conductor cable, one conductor 92 of which supplies 12 Volts to the enable relay 90, and the return path 94 of which sinks the relay current through the MOSFET 86. Owing to the inherently high noise immunity of the master/slave interface, this cable may typically be on the order of 100 ft. long. In parallel with its nominal load 88 and the enable relay 90 in the slave, MOSFET 86 also drives the LED 80 associated with the master output jack 76. This LED indicates that the slave enable output line is active. Similarly, the LED 78 associated with the slave input jack 74 is connected in parallel with enable relay 90, and is used to indicate that the slave is receiving the enable input signal from the master. Note, in FIG. 5, that relay 90 isolates the master 82 from the slave 84; consequently, electrical interference between the two is negligible. Also, noise susceptibility does not worsen with the addition of more slaves.

The utility of the present system and method is not restricted to the exemplary embodiment discussed herein. It should be apparent that the power sequencer is adaptable to a variety of power distribution applications. For example, this technology could be of benefit in large multi-element electric signs, whereby the significant startup current could be distributed over time, thus lessening stress on switches and wiring. It could also provide a cost savings in power supplies in computers and other electronic equipment; by eliminating the need to simultaneously startup multiple loads, it may be possible to avoid the use of rugged, but expensive components. Due to its simplicity and low cost, the present design lends itself to mass manufacturing.

The exemplary embodiment of the power sequencer described herein is comprised of discrete components or modules. However, the present system and method are not limited to this realization, and are suitable for implementation by a variety of execution devices. For example, the logic and control functions could also be implemented in programmable logic, or using a low-cost general-purpose microcontroller; this could result in cost savings, space reduction and improved manufacturability.

It is believed that the majority of the power sequencer circuitry could be combined into an integrated circuit. An exception to this, for high-power applications, would be the actual power-switching components. However, in many situations involving moderate power levels, semiconductor switches could be substituted for electromechanical relays; it would then be feasible to render the entire sequencer as a single IC or hybrid. A power sequencer IC could thus be an inexpensive enhancement to many existing products, such as power strips or laptop computers.

It will be appreciated by those skilled in the art having the benefit of this disclosure that this invention is believed to present a system and method for sequencing power to multiple electrical loads. Further modifications and alternative embodiments of various aspects of the invention will be apparent to those skilled in the art in view of this description. Such details as the number and order of power output channels and the load activation intervals described herein are exemplary of a particular embodiment. It is intended that the following claims be interpreted to embrace all such modifications and changes and, accordingly, the specification and drawings are to be regarded in an illustrative rather than a restrictive sense.

What is claimed is:

1. A method for connecting a plurality of loads to an electrical power source, said method comprising:

consecutively connecting, through a first connection circuit, each of a first plurality of loads to the power source at prescribed time intervals determined by successive transitions of a clock signal, wherein said first connection circuit is configured such that it connects none of the first plurality of loads to the power source until it receives an enable input signal from a third connection circuit; and coincident with connecting a last one of the plurality of loads to the power source, forwarding an enable output signal to a second connection circuit for connecting a second plurality of loads to the power source.

2. The method as recited in claim 1, wherein connecting the first plurality of loads to the power source is delayed for a prescribed interval following activation of the power source.

3. The method as recited in claim 1, wherein the electrical power source is 220 VAC or 110 VAC line voltage.

4. The method as recited in claim 1, wherein the electrical power source is a DC voltage of at least 12 Volts.

5. The method as recited in claim 1, wherein the prescribed time intervals are at least 0.016 seconds.

6. The method as recited in claim 1, wherein the loads comprise devices or systems capable of being operated from the electrical power source.

7. A system for connecting a plurality of loads to an electrical power source, comprising:

a timing signal source;

a distribution network, adapted to receive the timing signal, and distribute multiple progressively-delayed signals determined by successive transitions of the timing signal;

a plurality of controllable power switching elements, each of which may be activated by one of the multiple progressively-delayed signals; and control circuitry, adapted to generate an enable output signal when all of the controllable power switching elements are active, wherein the control circuitry is adapted to inhibit operation of the distribution network until it receives an enable input signal so that none of the loads are connected to the electrical power source until after the enable input signal has been received.

8. The system as recited in claim 7, wherein the control circuitry is adapted to inhibit operation of the distribution network for a prescribed interval following initial activation of the power source so that none of the loads are connected to the power source until after the prescribed interval following initial activation of the power source.

9. The system as recited in claim 7, wherein the distribution network comprises a shift register having a serial input and parallel outputs.

10. The system as recited in claim 7, wherein the controllable power switching elements comprise electromechanical or solid-state relays.

11. The system as recited in claim 7, wherein the timing source, control circuitry and distribution network are combined on an integrated circuit.

12. The system as recited in claim 7, wherein the distribution network includes current-amplifying devices capable of activating the power switching elements.

13. The system as recited in claim 7, wherein the timing source, control circuitry and distribution network are implemented as an execution device.

14. The system as recited in claim 13, wherein the execution device comprises a microcontroller.

15. A connection circuit, comprising:
   a first input terminal coupled to receive a first power supply voltage;
   a second input terminal coupled to receive an enable input signal;
   a first output terminal coupled to transmit an enable output signal; and
   a second set of output terminals adapted to couple the first power supply voltage to a plurality of load circuits at intervals determined by successive transitions of a clock signal, separate and distinct from another plurality of load circuits adapted also for connection to a second power supply voltage;
   wherein the connection circuit is configured such that it connects none of the first plurality of loads to the power source until it receives an enable input signal from a third connection circuit.

16. The connection circuit as recited in claim 15, further comprising shift registers and drivers serving as a distribution network for transmitting progressively delayed versions of a timing signal.

17. The connection circuit as recited in claim 15, further comprising a plurality of power switching elements sequentially activated by progressively delayed timing signals.

18. The connection circuit as recited in claim 15, wherein the connection circuit may be configured as a first group of master and slave units coupled in series with a second group of master and slave units, whereby a master within the second group can be configured to ignore an enable input signal sent from a master within the first group.

19. A method for connecting a plurality of loads to an electrical power source, said method comprising:
   consecutively connecting, through a first connection circuit, each of a first plurality of loads to the power source in response to a respective one of a plurality of successive transitions of a clock signal; and
   coincident with connecting a last one of the plurality of loads to the power source, forwarding an enable output signal to a second connection circuit for connecting a second plurality of loads to the power source;
   wherein said first connection circuit comprises a shift register including a plurality of bit positions and wherein each bit position corresponds to a respective power connection of one of said plurality of loads; and
   wherein said shift register is configured to propagate an enable signal from a given bit position to an adjacent bit position in response to a given successive transition of said clock signal, and wherein said first connection circuit is further configured to connect the respective power connection corresponding to said adjacent bit position to the power source in response to said propagating.

20. The method as recited in claim 19, wherein connecting the first plurality of loads to the power source is delayed for a prescribed interval following activation of the power source.

21. The method as recited in claim 19, wherein said first connection circuit may be configured such that it connects none of the first plurality of loads to the power source until it receives an enable input signal from a third connection circuit.

22. The method as recited in claim 19, wherein the electrical power source is 220 VAC or 110 VAC line voltage or a DC voltage of at least 12 Volts.

23. The method as recited in claim 19, wherein the loads comprise devices or systems capable of being operated from the electrical power source.

24. A system for connecting a plurality of loads to an electrical power source, comprising:
   a timing signal source;
   a distribution network, adapted to receive the timing signal, and distribute multiple progressively-delayed signals, wherein each progressively-delayed signal is asserted in response to a respective one of a plurality of successive transitions of the timing signal;
   a plurality of controllable power switching elements, each of which may be activated by an assertion of a corresponding one of the multiple progressively-delayed signals;
   a shift register including a plurality of bit positions, wherein each bit position corresponds to a respective one of said multiple progressively-delayed signals, wherein-said shift register is configured to propagate an enable signal from a given bit position to an adjacent bit position in response to a given successive transition of said timing signal, and wherein said distribution network is further configured to assert the progressively-delayed signal corresponding to said adjacent bit position in response to said propagating; and
   control circuitry, adapted to generate an enable output signal when all of the controllable power switching elements are active.

25. The system as recited in claim 24, wherein said control circuitry is configurable as either master or slave, and wherein if the control circuitry is configured as a slave the control circuitry is adapted to inhibit operation of the distribution network until it receives an enable input signal so that none of the loads are connected to the electrical power source until after the enable input signal has been received.

26. The system as recited in claim 24, wherein the control circuitry is adapted to inhibit operation of the distribution network for a prescribed interval following initial activation of the power source so that none of the loads are connected to the power source until after the prescribed interval following initial activation of the power source.

27. The system as recited in claim 24, wherein the controllable power switching elements comprise electromechanical or solid-state relays.

28. The system as recited in claim 24, wherein the timing source, control circuitry and distribution network are combined on an integrated circuit.

29. The system as recited in claim 24, wherein the distribution network includes current-amplifying devices capable of activating the power switching elements.

30. A connection circuit, comprising:
   a first input terminal coupled to receive a first power supply voltage;
   a second input terminal coupled to receive an enable input signal;
   a first output terminal coupled to transmit an enable output signal; and
   a second set of output terminals adapted to couple the first power supply voltage to each of a plurality of load circuits in response to a respective one of a plurality of successive transitions of a clock signal, separate and distinct from another plurality of load circuits adapted also for connection to a second power supply voltage;
   wherein the connection circuit is configured such that it connects none of the first plurality of loads to the power source until it receives an enable input signal from a third connection circuit.

31. The connection circuit as recited in claim 30, further comprising shift registers and drivers serving as a distribution network for transmitting progressively delayed versions of a timing signal.

32. The connection circuit as recited in claim 30, further comprising a plurality of power switching elements sequentially activated by progressively delayed timing signals.

33. The connection circuit as recited in claim 30, wherein the connection circuit may be configured as a first group of master and slave units coupled in series with a second group of master and slave units, whereby a master within the second group can be configured to ignore an enable input signal sent from a master within the first group.

* * * * *